United States Patent [19]

Meyer et al.

[11] Patent Number: 5,312,486
[45] Date of Patent: May 17, 1994

[54] WATER-CONTAINING, HARDENABLE FOAM COMPOSITIONS WITH INORGANIC COMPONENTS AND PROCESS FOR THEIR PREPARATION

[76] Inventors: Frank Meyer, Bogenstrasse 10, 4300 Essen 15; Hans Mehesch, Frillendorfer Höhe 38, 4300 Essen 1; Wolfgang Cornely, Lohstrasse 30, 4390 Gladbeck; Martin Fischer, Siepenstrasse 4, 4200 Oberhausen; Birgit Riecks, Bentheimer Strasse 4, 4300 Essen 1; Karlheinz Neuschäffer, Böttnerstrasse 6, 5653 Leichlingen, all of Fed. Rep. of Germany

[21] Appl. No.: 859,644

[22] Filed: Mar. 23, 1992

Related U.S. Application Data

[63] Continuation of Ser. No. 499,393, Jun. 11, 1990, abandoned.

[30] Foreign Application Priority Data

Dec. 24, 1987 [DE] Fed. Rep. of Germany ....... 3744210

[51] Int. Cl.$^5$ .............................................. C04B 28/26
[52] U.S. Cl. ................................................... 106/627
[58] Field of Search ............... 106/629, 630, 627, 673, 106/678, 679, 600, 601, 602, 605

[56] References Cited

U.S. PATENT DOCUMENTS

| | | | |
|---|---|---|---|
| 531,369 | 12/1894 | Forbush et al. | 106/605 |
| 2,481,390 | 9/1949 | Campbell | 106/605 |
| 3,095,312 | 6/1963 | Holmes | 106/25 |
| 3,850,650 | 11/1974 | Von Bonin et al. | 106/75 |
| 3,864,137 | 2/1975 | Bonin et al. | 106/25 |
| 4,522,652 | 6/1985 | Neuschäffer et al. | 106/84 |
| 4,533,393 | 8/1985 | Neuschaeffer et al. | 106/18.12 |
| 4,608,795 | 9/1986 | Neuschaeffer et al. | 52/309.12 |
| 4,655,837 | 4/1987 | Jong | 106/71 |
| 4,659,385 | 4/1987 | Costopoulos et al. | 106/87 |
| 4,664,712 | 5/1987 | Cisneros | 106/84 |
| 4,681,631 | 7/1987 | Engels et al. | 106/4 |
| 4,683,019 | 7/1987 | Motoki | 156/293 |

FOREIGN PATENT DOCUMENTS

| | | |
|---|---|---|
| 2227640 | 6/1972 | Fed. Rep. of Germany . |
| 2525611 | 6/1975 | Fed. Rep. of Germany . |
| 3512588 | 4/1985 | Fed. Rep. of Germany . |

*Primary Examiner*—Mark L. Bell
*Assistant Examiner*—A. Wright

[57] ABSTRACT

Hardenable foam compositions comprising oxygen-releasing foaming agents, a hardener consisting of an alkali silicate solution, a fine particle solid material which reacts with said hardener, namely an oxide mixture consisting of $SiO_2$ and $Al_2O_3$ extracted from a filter dust, an electrofilter ash from high-temperature power plants, and calcinated bauxite or amorphous silica, to which reaction accelerators are added, are improved, firmer, faster hardening foams. Reducing agents, in particular sulphur compounds with a reducing action are preferred. Oxidizing agents or fine particle substances such as soot or color pigments are effective.

5 Claims, No Drawings

WATER-CONTAINING, HARDENABLE FOAM COMPOSITIONS WITH INORGANIC COMPONENTS AND PROCESS FOR THEIR PREPARATION

This application is a continuation of application Ser. No. 07/499,393, filed Jun. 11, 1990, now abandoned.

This invention relates to pourable, water-containing foam compositions based on alkali-containing, inorganic components which upon addition of an oxygen-releasing foaming agent form foam compositions, as well as to the process for the preparation of such compositions.

Water-containing, hardenable molding compositions are known from EP-A2-0 148 280, which are prepared from alkali silicate solutions to which an alkali hydroxide is optionally added, and an anhydrous, finely divided oxide mixture which contains $SiO_2$ amounts of 7 to 75 wt.-% and $Al_2O_3$ in amounts of 12 to 87 wt.-% as principal components. This oxide mixture is generated in the form of a dust in industrial melting processes. Fillers may be added to these molding compositions. Such molding compositions harden at temperatures of 50° to 150° C. into shaped bodies with substantial strength.

The hardening of the molding compositions into shaped bodies with substantial strength even at low temperatures and high water contents without the need of a firing process, but with the possibility of exposing the shaped bodies to high temperatures, apparently requires solid reaction components of a very specific type.

In accordance with EP-A2-0 199 941, calcined bauxite or a vitreous amorphous electrofilter ash from high temperature hard coal-fired power plants may also be used as the solid reaction component. The reactive solids are present in fine distribution. The calcined bauxite and the fillers are milled.

Foaming agents, especially peroxides in the form of inorganic or organic peroxides, percarbonates and especially in the form of $H_2O_2$ may be added to these molding compositions.

When oxygen-releasing foaming agents are used, the foaming reaction proceeds in dependence from the type and amount of peroxide as an exothermic reaction with the alkali hydroxide contained in the composition. Some peroxides require exterior heating until the initiating temperature, which may result in uneven hardening in the case of large shaped bodies. The foaming and especially the hardening take place comparatively slowly. These types of foaming compositions do not always produce finely pored foam bodies with uniform pores. A subsequent heat treatment from outside, for instance in non-stationary installations or when they are used as on-site produced foam for filling of profiles, channels or similar hollow bodies, is not possible.

From DE-A1-22 27 640 (Bayer) a process for foaming of aqueous silicate solutions is known. The foaming action is produced by reaction of hydrogen peroxide with a reducing agent accompanied by release of a gas.

The invention is based on the object to provide a water-containing, hardenable foam composition and a process for its production, in which an external heat introduction is not necessary and a rapid hardening takes place, while at the same time low density and high strength by virtue of fine pores is achieved.

The object is achieved by a water-containing, hardenable foam composition according to patent claim 1 and by the process for its preparation according to process claim 12 as well as the dependent claims.

In accordance with the invention, preferably a peroxide and very preferably $H_2O_2$, particularly in the form of a 5 to 25 wt.-% aqueous solution, is used as the oxygen-releasing foaming agent. The amount of the foaming agent, calculated as $H_2O_2$, should be 0.2 to 5.0 wt.-%, preferably 0.3 to 3.0 wt.-%, based on the weight of the foam composition.

The reacting components of the foam composition are with respect to type and amount the same finely divided reactive solids and the same hardener in the form of an alkali silicate solution with actual contents of alkali hydroxide, as they are known from the above mentioned state of the art. The reactive solid is preferably a finely divided oxide mixture with analytical contents of 7 to 75 wt.-% of amorphous, non-vitreous $SiO_2$ and 12 to 87 wt.-% $Al_2O_3$ with minor crystalline components, which is separated as filter dust in high temperature processes, for example, by melting of corundum.

Electrofilter ash from hard coal power plants with combustion chamber temperatures above 1600° C. with analytical contents of 45 to 60 wt.-% $SiO_2$ in vitreous form and 25 to 35 wt.-% amorphous $Al_2O_3$ in addition to, for example, $Fe_2O_3$, or calcined milled bauxite may also be used. Amorphous, water-containing or possibly dehydrated, powdery silicic acid is also a preferred reactive solid.

It has been found that the addition of preferably reducing agents, very preferably of reducing sulphur compounds, or of oxidizing agents in fine distribution or of finely divided materials with a large internal surface, produces an exothermic reaction with the peroxides and thus acts as a reaction accelerator and auxiliary foaming agent. The temperature increase in the reaction mixture leads to an acceleration of the foaming action and of the hardening as well as to a very uniform and fine-celled foam of reduced density. Especially the preferred reducing agents and to a particular degree the sulphur compounds with the reducing effect make it possible by variation of the reducing agents and its concentration to vary the hardening time as desired and to predetermine it exactly.

The amount of added reaction accelerator should be 0.1 to 9, preferably 0.5 to 5 wt.-%, based on the foam composition.

Suitable reducing agents are sulphur compounds with a reducing effect, for instance alkali sulphite, alkali pyrosulphite, alkali dithionite, the alkali salt of hydroxymethanesulphinic acid (Rongalit), optionally also alkali thiosulphate or for example also alkali phosphite or alkali borohydrite as reducing agents which do not contain sulphur. Among the alkali compounds, sodium compounds are preferred.

Suitable oxidizing agents are, for example, chromates such as alkali chromate or bichromate, Cu(II)-salts or Fe(III)-salts, such as the chlorides or sulphates. The oxidizing agents also produce a temperature increase.

Suitable substances with a large internal surface, for example, of 200 to 1600 $m^2/g$ according to BET are, among others, carbon black, iron pigments such as iron ochre, red iron oxide or finely divided iron oxides.

These substances significantly accelerate the decomposition of the peroxide. Substances with a high BET-surface, for instance, larger than 1000 $m^2/g$, are already effective in very small amounts and may possibly be combined in small amounts with larger amounts of a reducing agent, and thus reduce the foam density and increase the fineness of the foam.

By virtue of the addition of the reaction accelerator in accordance with the invention, it has been possible to prepare improved foam compositions. The hardening time is better controllable, especially due to the reducing agent without heat supply from outside. The foams thus produced have a finer foam structure, so that the mechanical strength is improved in comparison to the foams known from the state of the art.

The solid substances may be provided separately from each other or preferably in the form of a solid substance mixture consisting of one or several of the reactive solids and one or several inert fillers.

The amount of reactive solids with respect to the fillers is preferably 60 to 100:40 to 0 wt.-%.

Suitable fillers are preferably light weight fillers, for example, fly ash, expanded clay, vermiculite, perlite, mica, ground quartz, ground basalt, talcum, ground slate, vitreous foam or the like, and mixtures thereof.

The amount of reactive solid is preferably 2.2 to 7.0, very preferably 2.5 to 6.0 parts by weight per part of dissolved $SiO_2$, to the extent that medium water contents, alkali contents and filler contents are employed, and the indicated property combination of being rigid and light is sought to be achieved, and a pumpability is to be achieved as well.

The accelerating effect of the reducing agent does not come into play until the moment when the foaming agent is added, that is, until that point in time when the reaction mass, depending upon the composition and temperature, is stable and transportable without hardening for a period of 10 to 120 minutes, for example. As a result it is possible for the composition to be transported without the foaming agent to the location of foaming, and for the foaming agent to be added there. This is especially advantageous for employment of the composition in underground mining and tunneling. Hollow spaces of all types can be filled, for instance for the purpose of maintaining or restoring the rock face, as well as for sealing purposes, in which case the foaming composition penetrates even into cracks. The foaming action can take place without molds, or with a possibly simple mold applied only temporarily or partially, or with an exact mold, since the foam also fills undercuts and the like and takes on the exact shape of the mold without shrinking. Furthermore, in a fixed location plant, series of foam bodies can be produced one after the other by successively filling the molds from the same mixing equipment for the preparation of the foam composition by way of pipes. After hardening, the foam has a high compression strength. The process for the production of the foam composition is carried out according to the invention so that the foaming agent is added preferably as the last ingredient in close proximity to the location where the foaming is to take place.

The reaction accelerator is preferably added by admixing it with the solid substance which optionally contains filler or with the hardener.

EXAMPLE

For the production of foaming compositions, the following components were used.

|  | $SiO_2$ | $Na_2O$ | $K_2O$ (in % by weight) |
| --- | --- | --- | --- |
| Hardener 1 | 23 | 6.8 | 16.5 |

|  | $SiO_2$ | $Na_2O$ | $K_2O$ (in % by weight) |
| --- | --- | --- | --- |
| Hardener 2 | 26 | 18.0 | — |
| Hardener 3 | 25 | — | 27.0 |
| Hardener 4 | 24 | 8.6 | 12.4 |

2. Mixture of solid matter
1 64% by weight 01$^x$; 36% by weight fillers
2 66% by weight 02$^{xx}$; 34% by weight fillers
3 60% by weight E1$^{xxx}$; 40% by weight fillers
4 69% by weight E2$^{xxxx}$; 31% by weight fillers x = reactive solid matter, oxide mixture with 22% by weight $SiO_2$, 77% by weight $Al_2O_3$ xx = reactive solid matter, oxide mixture with 27% by weight $SiO_2$, 82% by weight $Al_2O_3$ xxx = reactive solid matter, oxide mixture with 40% by weight $SiO_2$, 50% by weight $Al_2O_3$ xxxx = reactive solid matter, finely divided amorphous $SiO_2$.

The reactive solids contained 1 to 10% of subsidiary constituents as oxides, e.g., $Fe_2O_3$.

3. Reducing Agent
Sodium dithionite $Na_2S_2O_4$
Sodium sulphide $Na_2S$
Sodium pyrosulphite $Na_2S_2O_5$
Rongalit $NaSO_2CH_2OH$ 4 Hydrogen peroxide solution, 10% by weight in water.

EXAMPLE 1

104 g of hardener 1 and 128 g of solids 1 with a content of reducing agent as indicated in Table 1 below, were stirred in a 0.5 liter vessel to form a pourable composition. Thereafter, 20 g of hydrogen peroxide solution were stirred in. The temperature profile was measured in the center of the foam composition which developed. Solid matter 2 in the indicated amount yielded corresponding results upon processing of the indicated amounts of hardener 1 and hardener 4.

EXAMPLE 2

104 g of hardener 1 and 128 g of solid matter 1 with a reducing agent content as indicated in Table 2 below were stirred in a 0.5 liter vessel to form a pourable composition. Thereafter, 20 g of hydrogen peroxide solution were stirred in. Table 2 indicates the reaction times and material characteristics.

The start time denotes the time from the beginning of the mixing process until the beginning of foaming, the rise time denotes the time from the beginning until the end of foaming, the gelling time denotes the time from the beginning of the mixing process to the solidification of the foam.

The bulk density indicates the crude density of the dry foam. The monoaxial compressive strength was measured according to DIN 52 105 on 16 mm cubes.

Corresponding results were obtained with a combination of the indicated amounts of hardener 2 and solid 1 and hardener 3 with the solids 3 and 4. Corresponding results were also obtained upon addition of 22 g of a 12% by weight solution of $H_2O_2$.

EXAMPLE 3

104 g of hardener 1 were admixed with 128 g of solids 1 to which 1.2% of sodium dithionite were added. The mixture was no longer pumpable after 70 minutes and it gelled after 105 minutes.

EXAMPLE 4

104 g of hardener 1 were admixed with 128 g of solid 1 to which 1.2% sodium dithionite had been added. After 50 minutes, 20 g of hydrogen peroxide solution were added. The composition began to foam after 15 seconds and continued to foam over a period of 70 seconds. The composition gelled after 8 minutes and 30 seconds. The average bulk density of the dry foam composition was 280 kg/m$^3$. The monoaxial compressive strength was 0.54 N/mm$^2$.

EXAMPLE 5

In a building material mixing plant, 250 kg of solid which contained 2.0 wt.-% Rongalit were mixed in several portions with 203 kg of hardener 1. The suspension was transported from a continuously stirred supply with the aid of a piston pump through a high pressure hose with an internal diameter of 25 mm and a length of 200 meter at a throughput rate of 25 kg/min. Simultaneously, a 10 wt.-% aqueous hydrogen peroxide solution was introduced into the suspension stream from a supply vessel at a throughput rate of 3 kg/min with the aid of a piston pump through a high pressure hose of 10 mm internal diameter and 200 meter length which had an 8-jet ring nozzle attached to its end. Behind the ring nozzle the mixture passed through a static mixer and was discharged into a space to be filled. The mixture foamed within 40 seconds after emergence into a 5-fold volume. Within 16 minutes a hollow space of 1 m$^3$ was filled. After 20 minutes the foam could be walked upon. The monoaxial compressive strength determined according to DIN 52105 was 0.8 N/mm$^2$.

TABLE 1

| Amount of Reducing Agent % by weight | Na$_2$S$_2$O$_4$ GT. min | Na$_2$S$_2$O$_4$ Tm. °C. | Rongalit ® GT. min | Rongalit ® Tm. °C. | Na$_2$S$_2$O$_5$ GT. min | Na$_2$S$_2$O$_5$ Tm. °C. | Na$_2$S GT. min | Na$_2$S Tm. °C. |
|---|---|---|---|---|---|---|---|---|
| 0 | 140' | 38 | 140' | 38 | 140 | 38 | 140' | 38 |
| 0.4 | 45' | 46 | 45' | 49 | 70 | 44 | 30 | 48 |
| 1.2 | 8'30" | 59 | 7' | 72 | 30' | 55 | 12' | 60 |
| 1.6 | 6' | 69 | 5' | 78 | 25' | 58 | 6' | 68 |
| 2.0 | 4' | 79 | 4' | 79 | 20' | 63 | 4' | 74 |
| 3.1 | 2' | 84 | 3'30" | 80 | 10' | 70 | 3' | 86 |
| 5.0 | 1' | 81 | 4'30" | 77 | 3'30" | 76 | 2' | 82 |

GT.: Gelling time
Tm.: Maximum Temperture

TABLE 2

| Reducing Agent % by weight | Start time (s) | Rise time (s) | Gelling time (s) | Bulk density (kg/m$^3$) | Monoaxial compressive strength (N/mm$^2$) |
|---|---|---|---|---|---|
| 0 | 15 | 200 | 140 | 260 | 0.19 |
| 1.2% Sodium dithionite | 10 | 70 | 8,5 | 280 | 0.54 |
| 2.0% Sodium dithionite | 9 | 40 | 4 | 330 | 0.72 |
| 1.2% Rongalit ® | 10 | 60 | 6 | 300 | 0.58 |
| 2.0% Rongalit ® | 9 | 40 | 4 | 345 | 1.03 |

EXAMPLES 6 to 9

Analogous to Example 4, the following reaction accelerators were added to 120 g hardener 1 and 120 g solid 2 or 110 g solid 4:

| | |
|---|---|
| 0.8% by weight carbon black (BET 1200 m$^2$/g) | Example 6 |
| or | |
| 1.4% by weight of red iron oxide | Example 7 |
| or | |
| 1.8% by weight of potassium bichromate as oxidizing agent | Example 8 |
| or | |
| 2.4% by weight iron-III-sulphate as oxidizing agent | Example 9 |

The composition foamed for 50 to 120 seconds, 15 to 45 seconds after addition of the hydrogen peroxide solution. Hardening took place in 10 to 60 minutes.

We claim:

1. An improved pourable, water-containing, hardenable foam composition comprising the conventional ingredients
   (a) as a hardener, dissolved SiO$_2$ in the form of an aqueous solution of alkali metal silicates,
   (b) per part by weight of dissolved SiO$_2$, 0.7 to 2.5 parts by weight of K$_2$O or 0.55 to 1.5 parts by weight of NA$_2$O,
   (c) per part of weight of dissolved SiO$_2$, 1.3 to 10 parts by weight of at least one solid selected from the group consisting of oxide mixtures containing amorphous SiO$_2$ and aluminum oxide, vitreous amorphous electrofilter ash, calcined bauxite, and undissolved SiO$_2$ in the form of amorphous, powdery, dehydrated or water-containing silicic acid,
   (d) fillers,
   (e) water, and
   (f) an oxygen-releasing foaming agent, wherein the improvement resides in that the composition further comprises 0.1 to 9% by weight, based on the total weight of the foam composition, of at least one reaction accelerator selected from the group consisting of
   (i) reducing agents selected from the group consisting of alkali metal pyrosulfites, alkali metal dithionites, alkali metal salts of hydroxy-methanesulphinic acid, alkali metal phosphites and alkali metal borohydrides, and
   (ii) oxidizing agents selected from the group consisting of alkali metal chromates, alkali metal bichromates, cu(II) salts and Fe(III) salts.

2. A foam composition of claim 1, wherein said reducing agent is an alkali metal pyrosulphite.

3. A foam composition of claim 1, wherein said reducing agent is an alkali metal dithionite.

4. A foam composition of claim 1, wherein said reducing agent is an alkali metal salt of hydroxymethanesulphinic acid.

5. A foam composition of claim 1, wherein said reducing agent is an alkali metal borohydride or an alkali metal phosphite.

* * * * *

UNITED STATES PATENT AND TRADEMARK OFFICE
CERTIFICATE OF CORRECTION

PATENT NO. : 5,312,486
DATED : May 17, 1994
INVENTOR(S) : Frank Meyer et al

It is certified that error appears in the above-indentified patent and that said Letters Patent is hereby corrected as shown below:

On the title page, insert the following:

--[73] Assignee:  Huls Troisdorf AG Troisdorf, Germany-- and after item [57] Abstract, insert --Attorney, Agent, or Firm—Felfe & Lynch--.

Signed and Sealed this

First Day of November, 1994

Attest:

BRUCE LEHMAN

Attesting Officer

Commissioner of Patents and Trademarks